(12) United States Patent
Liu et al.

(10) Patent No.: US 12,504,231 B2
(45) Date of Patent: Dec. 23, 2025

(54) THREADING APPARATUS

(71) Applicant: CONTEMPORARY AMPEREX TECHNOLOGY (HONG KONG) LIMITED, Hong Kong (CN)

(72) Inventors: Chaonan Liu, Ningde (CN); Haohua Song, Ningde (CN); Jiaxing Song, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 422 days.

(21) Appl. No.: 18/174,934

(22) Filed: Feb. 27, 2023

(65) Prior Publication Data
US 2023/0272976 A1 Aug. 31, 2023

(30) Foreign Application Priority Data
Feb. 28, 2022 (CN) .......................... 202220424518.8

(51) Int. Cl.
*F27B 9/26* (2006.01)
*F27D 3/12* (2006.01)
*H01M 4/04* (2006.01)

(52) U.S. Cl.
CPC .................. *F27B 9/26* (2013.01); *F27D 3/12* (2013.01); *H01M 4/0471* (2013.01); *F27D 2003/124* (2013.01)

(58) Field of Classification Search
CPC ...... F27B 9/20; F27B 9/22; F27B 9/26; F27D 3/0024; F27D 3/12; F27D 2003/124; C21D 9/00; C21D 9/0081; H01L 21/68; H01L 21/67706
See application file for complete search history.

(56) References Cited

FOREIGN PATENT DOCUMENTS

| CN | 102356458 B | * | 10/2014 | ............. H10F 71/00 |
|---|---|---|---|---|
| CN | 212831063 U | | 3/2021 | |
| CN | 212952544 U | | 4/2021 | |
| CN | 214234797 U | | 9/2021 | |
| CN | 218808596 U | | 4/2023 | |
| EP | 3131139 A1 | | 2/2017 | |
| JP | 2002520780 A | * | 7/2002 | ............. H01M 4/745 |
| WO | WO-2014087473 A1 | * | 6/2014 | ................ F26B 3/04 |

OTHER PUBLICATIONS

The European Patent Office (EPO) Office Action for Application No. 23157745.3 Jul. 31, 2024 29 Pages.
The European Patent Office (EPO) Extended Search Report for EP Application No. 23157745.3 Jul. 21, 2023 8 Pages.

* cited by examiner

*Primary Examiner* — Gregory A Wilson
(74) *Attorney, Agent, or Firm* — ANOVA LAW GROUP, PLLC

(57) ABSTRACT

A threading apparatus for transporting an electrode plate includes an oven, a first guide rail and a second guide rail, and a threading assembly. The first guide rail and the second guide rail are spaced apart from each other inside the oven in a first direction. A first opening and a second opening are respectively provided on a surface of the first guide rail and a surface of the second guide rail that face each other. Two ends of the threading assembly in the first direction are movably disposed in the first guide rail and the second guide rail through the first opening and the second opening, respectively. The threading assembly is configured to be connected to the electrode plate for transporting the electrode plate inside the oven.

10 Claims, 2 Drawing Sheets

THREADING APPARATUS

CROSS-REFERENCE TO RELATED APPLICATION

This application claims priority to Chinese Application No. 202220424518.8, filed Feb. 28, 2022, the entire content of which is incorporated herein by reference.

TECHNICAL FIELD

This disclosure relates to the field of battery preparation technologies, in particular to a threading apparatus.

BACKGROUND

In a coating process, a battery electrode plate needs to be put into an oven for drying. In order to ensure the drying effect and production efficiency, the oven is generally long and provided with a plurality of guide rollers inside. As a result, a large part of the electrode plate is located in the oven in the coating process, causing an increased probability of breakage of the electrode plate in the oven.

When the electrode plate is broken in the oven, because the oven is long, the broken electrode plate can be manually pulled out of the oven for connection only when a side door of the oven is opened. In this process, because the electrode plate is pulled partly out of the oven, a force application direction will deviate from a movement direction of the electrode plate in the oven, causing misalignment or even secondary breakage of the electrode plate. In addition, manual connection from the side is not conducive to improving productivity.

SUMMARY

In view of this, it is necessary to provide a threading apparatus to resolve the problem that electrode plates broken in a coating process are inconveniently handled.

According to a first aspect, this application provides a threading apparatus for transporting an electrode plate, including an oven, a first guide rail and a second guide rail, and a threading assembly. The first guide rail and a second guide rail are spaced apart from each other inside the oven in a first direction, and a first opening and a second opening are respectively provided on surfaces of the first guide rail and the second guide rail that face each other. Two ends of the threading assembly in the first direction are movably disposed in the first guide rail and the second guide rail through the first opening and the second opening, respectively, and the threading assembly is connected to the electrode plate for transporting the electrode plate inside the oven.

The threading assembly can fasten electrode plate and drive the electrode plate to move along the first guide rail and the second guide rail, so as to implement automatic threading of the electrode plate inside the oven, thereby facilitating connection of the broken electrode plate. In addition, the threading assembly is inserted into the first guide rail and the second guide rail in the first direction, which can reduce the occupied space in a height direction, thereby improving the space utilization rate inside the oven.

In some embodiments, the threading assembly includes a threading rod and two movable assemblies, where the threading rod is connected to the electrode plate, the two movable assemblies are disposed at two ends of the threading rod in the first direction, respectively, and the movable assemblies are movably disposed in the first guide rail and the second guide rail, respectively.

The threading rod is fixedly connected to the electrode plate, and the two movable assemblies are respectively located at two ends of the threading rod and move synchronously in the first guide rail and the second guide rail, such that forces applied on the two ends of the threading rod can be more uniform, which makes a force applied on the electrode plate in the moving process more uniform and effectively avoids the breakage.

In some embodiments, the first guide rail is provided with a first guide groove extending in a second direction, the second guide rail is provided with a second guide groove extending in the second direction, and the two movable assemblies are movably accommodated in the first guide groove and the second guide groove, respectively; where the second direction is a transporting direction of the electrode plate and intersects the first direction.

The first guide groove and the second guide groove can respectively restrict the two movable assemblies therein, thereby making the two movable assemblies move more stably.

In some embodiments, the movable assembly includes a connection portion, first sliding wheels, and a floating portion. The connection portion is connected to the threading rod, and the first sliding wheels are disposed on the connection portion. The floating portion is disposed on a side of the connection portion facing away from the threading rod, where a side of the floating portion facing away from the connection portion abuts against the first guide groove or the second guide groove so as to floatingly adjust a dimension of the threading assembly in the first direction.

A distance between the threading assembly and the first guide rail or the second guide rail in the first direction is flexibly adjusted by the floating portion, which can effectively avoid jamming of the threading rod caused by the collision between the connection portion and the first guide rail or the second guide rail, and can make the movement of the threading rod smoother.

In some embodiments, the floating portion includes a mounting bracket and an elastic member. The mounting bracket is spaced apart from the connection portion. The elastic member is connected between the mounting bracket and the connection portion so as to floatingly adjust the dimension of the threading assembly in the first direction.

The distance between the threading assembly and the first guide rail or the second guide rail in the first direction is adjusted by the elastic member, which can make the adjustment process more sensitive, improving the adjustment accuracy.

In some embodiments, the floating portion includes a second sliding wheel, where the second sliding wheel is rotatably connected to the mounting bracket, and spaced apart from the connection portion in the first direction. The second sliding wheel can convert sliding friction between the mounting bracket and the first guide rail or the second guide rail into rolling friction, reducing the friction therebetween, and making the movable assembly move more smoothly in the first guide rail or the second guide rail.

In some embodiments, the second sliding wheel exceeds the first sliding wheel in the first direction. When the movable assembly is accommodated in the first guide rail or the second guide rail, it can ensure that the second sliding wheel is first in contact with an inner wall of the first guide rail or the second guide rail, thereby ensuring that the elastic member can effectively adjust the distance between the threading assembly and the first guide rail or the first guide rail in the first direction.

In some embodiments, the first guide rail and the second guide rail are non-metallic guide rails; and/or the first sliding wheels and the second sliding wheel are non-metal sliding wheels. The use of non-metallic materials can prevent the first sliding wheels and the second sliding wheel from producing metal particles when moving in the first guide rail and the second guide rail, thereby preventing the metal particles from contaminating the electrode plate.

In some embodiments, the first guide rail and the second guide rail each include a top wall, a bottom wall, a first side wall, and two second side walls. The top wall is disposed opposite the bottom wall, the first side wall is connected between the top wall and the bottom wall, and the two second side walls are respectively formed by edges of the top wall and the bottom wall that are away from the first side wall extending toward each other and bending toward the first side wall. The top wall, the bottom wall, the first side wall, and the two second side walls in the first guide rail enclose the first guide groove, the top wall, the bottom wall, the first side wall, and the two second side walls in the second guide rail enclose the second guide groove, and the first side wall is constructed as a side wall of the corresponding first guide groove or the corresponding second guide groove. The first opening and the second opening are formed between the two second side walls in the first guide rail and between the two second side walls in the second guide rail, respectively.

The first guide groove and the second guide groove each formed through enclosure of the top wall, the bottom wall, the first side wall, and the two second side walls can better restrict the first sliding wheels therein, thereby ensuring stable movement of the movable assembly within the first guide rail or a second guide rail.

In some embodiments, some of the first sliding wheels are movably disposed between the top wall and the second side wall adjacent to the top wall, and the remaining first sliding wheels are movably disposed between the bottom wall and the second side wall adjacent to the bottom wall. In this way, the movable assembly is more tightly connected to the first guide rail and the second guide rail, preventing the movable assembly from detaching from the first guide rail or the second guide rail, thereby ensuring stable traveling of the electrode plate.

In the threading apparatus, the threading assembly drives the electrode plate to move inside the oven, threading the electrode plate, thereby preventing the electrode plate from being broken inside the oven. In addition, the first opening and the second opening are respectively provided on the surfaces of the first guide rail and the second guide rail that face each other, such that the threading assembly can be inserted into the first guide rail and the second guide rail in the first direction, thereby reducing the space occupied by the threading apparatus in the oven in a height direction and making the threading of the electrode plate smoother.

Figure 1:
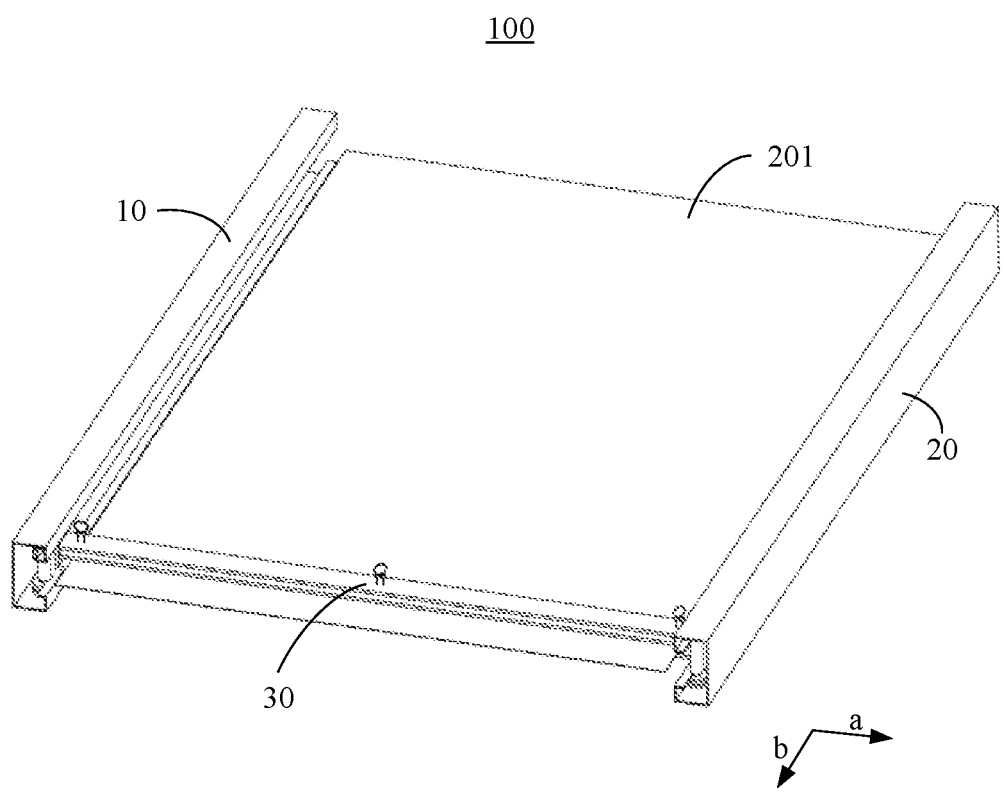
FIG. 1 is a schematic structural diagram of a threading apparatus according to an embodiment of this application.

In the drawings: 100: threading apparatus; 201: electrode plate; 10: first guide rail; 20: second guide rail; 30: threading assembly; 11: first opening; 12: first guide groove; 13: top wall; 14: bottom wall; 15: first side wall; 16: second side wall; 21: second opening; 22: second guide groove; 31: threading rod; 32: movable assembly; 321: connection portion; 322: first sliding wheel; 323: floating portion; 3211: escape groove; 3231: mounting bracket; 3232: elastic member; 3233: second sliding wheel; a: first direction; and b: second direction.

DESCRIPTION OF EMBODIMENTS

To make the above objectives, features, and advantages of this disclosure more obvious and easy to understand, the following describes the specific embodiments of this disclosure in detail with reference to the accompanying drawings. Many specific details are stated in the following descriptions in order to fully understand this disclosure. However, this disclosure can be implemented in many other ways different from those described herein, and those skilled in the art can make similar improvements without violating the connotation of this disclosure. Therefore, this disclosure is not restricted by the specific embodiments disclosed below.

In the descriptions of this disclosure, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of this disclosure and simplify the descriptions, are not intended to indicate or imply that the apparatuses or components mentioned in this disclosure must have specific orientations, or be constructed and operated for a specific orientation, and therefore shall not be construed as a limitation to this disclosure.

In addition, the terms "first" and "second" are merely intended for a purpose of description, and shall not be understood as an indication or implication of relative importance or implicit indication of the number of indicated technical features. Therefore, a feature defined by "first" or "second" may explicitly or implicitly include at least one such feature. In the description of this disclosure, the meaning of "plurality" is at least two, for example two or three, unless otherwise expressly specified.

In this disclosure, unless otherwise expressly specified and defined, the terms such as "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two components, unless otherwise expressly specified. Persons of ordinary skills in the art can understand specific meanings of these terms in this disclosure as appropriate to specific situations.

In this disclosure, unless otherwise expressly specified and defined, a first feature being "above" or "below" a second feature may mean that the first feature is in direct contact with the second feature or may mean that the first feature and the second feature are in indirect contact through an intermediary. Moreover, a first feature being "above", "over", and "on the top of" a second feature may mean that the first feature is directly above or obliquely above the second feature, or may simply mean that the first feature is higher in elevation than the second feature. Moreover, a first feature being "under", "below", and "underneath" a second feature may mean that the first feature is directly under or obliquely under the second feature, or may simply mean that the first feature is lower in elevation than the second feature.

It should be noted that when a component is referred to as being "fastened to" or "disposed on" another component, it may be directly fastened to the another component, or there may be a component in between. When a component is deemed as being "connected to" another component, it may be directly connected to the another component, or there may be a component in between. The terms "vertical", "horizontal", "upper", "lower", "left", "right", and other similar expressions as used herein are for illustration only, and are not intended to represent the only implementation.

Currently, from the perspective of market development, use of traction batteries is becoming more and more extensive. Traction batteries are used not only in energy storage power supply systems such as hydroelectric power plants, thermal power plants, wind power plants, and solar power plants, but also widely used in electric transportation tools such as electric bicycles, electric motorcycles, electric vehicles, and fields such as military equipment and aerospace. Along with the continuous expansion of application fields of traction batteries, market demands for traction batteries are also expanding.

A production process of traction batteries includes a coating process. In the coating process, coated battery electrode plates need to be dried in an oven for subsequent treatment. However, to ensure the drying effect and production efficiency, the oven is often provided long such that the electrode plate can be adequately dried. For this reason, during the movement of the electrode plate in the oven, it is much likely that the electrode plate experiences non-uniform force and becomes broken.

In view of the foregoing breakage problem of the electrode plate, if there is no auxiliary apparatus, the conventional method is to stop heating the oven by an operator. After the temperature in the oven drops to an appropriate temperature, the operator puts on labor protection appliance, opens the side door of the oven, and manually pulls the electrode plate in the oven from the side to pass through the oven. After the electrode plate is pulled out of the oven, it is connected to the other broken electrode plate, and this connected part is wound up by slowly traveling. During this period, there is a time-consuming problem. Specifically, enough time is needed for the oven to cool down and heat up after restarting. In addition, when the electrode plate is manually pulled out of the oven, it is easy to cause a force application direction to deviate from a movement direction of the electrode plate in the oven, resulting in misalignment or even secondary breakage of the electrode plate. In addition, due to a narrow space in the oven, it is inconvenient and time-consuming to manually pull the electrode plate out of the oven.

Therefore, in some existing technologies, a threading auxiliary structure is provided inside the oven, a fixing base is provided on an inner wall of the oven, a track is fixed, with an opening facing downward, on the fixing base, and a mobile trolley is inserted into the track from bottom to top, such that the trolley is connected to an electrode plate and drives the electrode plate to move along the track.

However, the inventors have found that existing ovens generally have small interior space, especially in the height direction, and in practice, height of the space inside the oven is usually only slightly greater than thickness of the electrode plate. Therefore, in actual operation, the foregoing threading auxiliary structure in the related art often has no practical application value.

Based on this, to implement the automatic threading of the electrode plate inside the oven and make full use of the interior space of the oven, the applicant has found that the automatic threading of the electrode plate can be effectively implemented by changing a fastening method of guide rails inside the oven, changing an opening direction of the guide rails, then changing a connection and cooperation mode between a threading assembly and the guide rails, and reducing the space occupied by a threading apparatus in an interior height direction of the oven.

From the above considerations, to effectively resolve the automatic threading of the electrode plate inside the oven and reduce the space occupied by the threading apparatus in the height direction of the oven, after in-depth research, the inventors have designed a threading apparatus, in which a threading assembly is inserted into a first guide rail and a second guide rail in a first direction, that is, in a width direction of the electrode plate. Therefore, the occupied space in the height direction can be reduced, and the electrode plate can be smoothly driven to move inside the oven to implement the automatic threading of the electrode plate.

Figure 2:
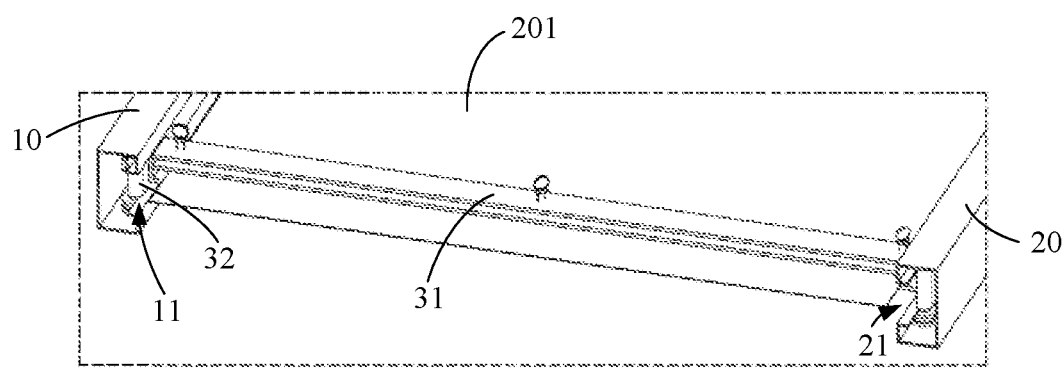
FIG. 2 is a schematic structural diagram of a threading apparatus according to an embodiment of this application.

Refer to FIG. 1 and FIG. 2. FIG. 1 and FIG. 2 each are a schematic structural diagram of a threading apparatus according to an embodiment of this application. An embodiment of this disclosure provides a threading apparatus 100 for transporting an electrode plate 201, including an oven (not shown in the figure), a first guide rail 10 and a second guide rail 20, and a threading assembly 30. The first guide rail 10 and a second guide rail 20 are spaced apart from each other inside the oven in a first direction a, and a first opening 11 and a second opening 21 are respectively provided on surfaces of the first guide rail 10 and the second guide rail 20 that face each other. Two ends of the threading assembly 30 in the first direction a are movably disposed in the first guide rail 10 and the second guide rail 20 through the first opening 11 and the second opening 21, respectively, and the threading assembly 30 is connected to the electrode plate 201 for transporting the electrode plate 201 inside the oven.

It should be noted that the threading apparatus 100 provided in this application can also be configured to transport other strip materials, with a working principle the same as that when transporting the electrode plate 201, which is not described herein.

Specifically, in this embodiment, the first direction a is a width direction of the electrode plate 201. The first guide rail 10 and the second guide rail 20 are fixed on two side walls inside the oven, respectively, and the first opening 11 and the second opening 21 are disposed facing each other. The threading assembly 30 is fixedly connected to the electrode plate 201, and the two ends of the threading assembly 30 in the width direction of the electrode plate 201 are inserted into the first guide rail 10 and the second guide rail 20 through the first opening 11 and the second opening 21, respectively, and can drive the electrode plate 201 to move synchronously along the first guide rail 10 and the second guide rail 20.

The first opening 11 and the second opening 21 are respectively located on the surfaces of the first guide rail 10 and the second guide rail 20 that face each other, meaning that opening directions of the first opening 11 and the second opening 21 are the width direction of the electrode plate 201. Therefore, the threading assembly 30 is movably disposed in the first guide rail 10 and the second guide rail 20 in the width direction of the electrode plate 201, and height of the threading device 100 is height of the first guide rail 10 and the second guide rail 20. In this way, space occupied by the threading apparatus 100 in a height direction can be greatly reduced, and the utilization of space inside the oven can be improved.

In some embodiments, the threading assembly 30 includes a threading rod 31 and two movable assemblies 32, where the threading rod 31 is connected to the electrode plate 201, the two movable assemblies 32 are disposed at two ends of the threading rod 31 in the first direction a, respectively, and the movable assemblies 32 are movably disposed in the first guide rail 10 and the second guide rail 20, respectively.

Specifically, the threading rod 31 extends in the width direction of the electrode plate 201 and is configured to fasten the electrode plate 201. The two movable assemblies 32 are disposed on the two ends of the threading rod 31 in the width direction of the electrode plate 201 respectively. When the movable assemblies 32 move within the first guide rail 10 and the second guide rail 20, the threading rod 31 can drive the electrode plate 201 to move along the first guide rail 10 and the second guide rail 20. In this way, the traveling and drying of the electrode plate 201 in the oven can be implemented.

Figure 3:
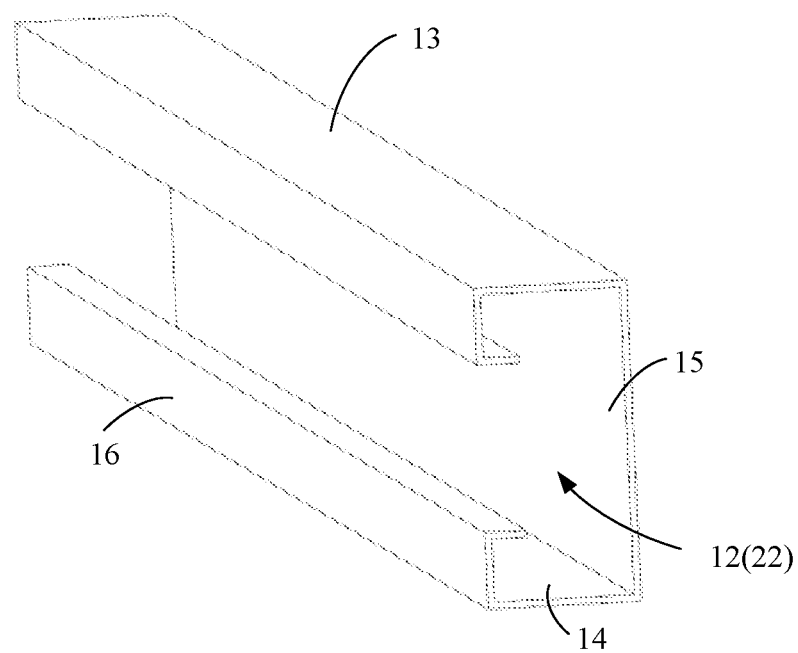
FIG. 3 is a schematic structural diagram of a first guide rail or a second guide rail according to an embodiment of this application.

Refer to FIG. 3. FIG. 3 is a schematic structural diagram of a first guide rail or a second guide rail according to an embodiment of this application. In some embodiments, the first guide rail 10 is provided with a first guide groove 12 extending in a second direction b, the second guide rail 20 is provided with a second guide groove 22 extending in the second direction b, and the two movable assemblies 32 are movably accommodated in the first guide groove 12 and the second guide groove 22, respectively. The second direction b is a transporting direction of the electrode plate 201 and intersects the first direction a.

Specifically, in this embodiment, the second direction b is perpendicular to the first direction a. The first guide groove 12 is disposed in an extension direction of the first guide rail 10, the second guide groove 22 is disposed in an extension direction of the second guide rail 20, the first opening 11 communicates with the first guide groove 12, and the second opening 21 communicates with the second guide groove 22. The two movable assemblies 32 can move within the first guide groove 12 and the second guide groove 22, respectively, so as to drive the electrode plate 201 to move smoothly in the extension directions of the first guide rail 10 and the second guide rail 20. In addition, the provision of the first guide groove 12 and the second guide groove 22 can enable the threading rod 31 to drive the electrode plate 201 to travel more stably.

Figure 4:
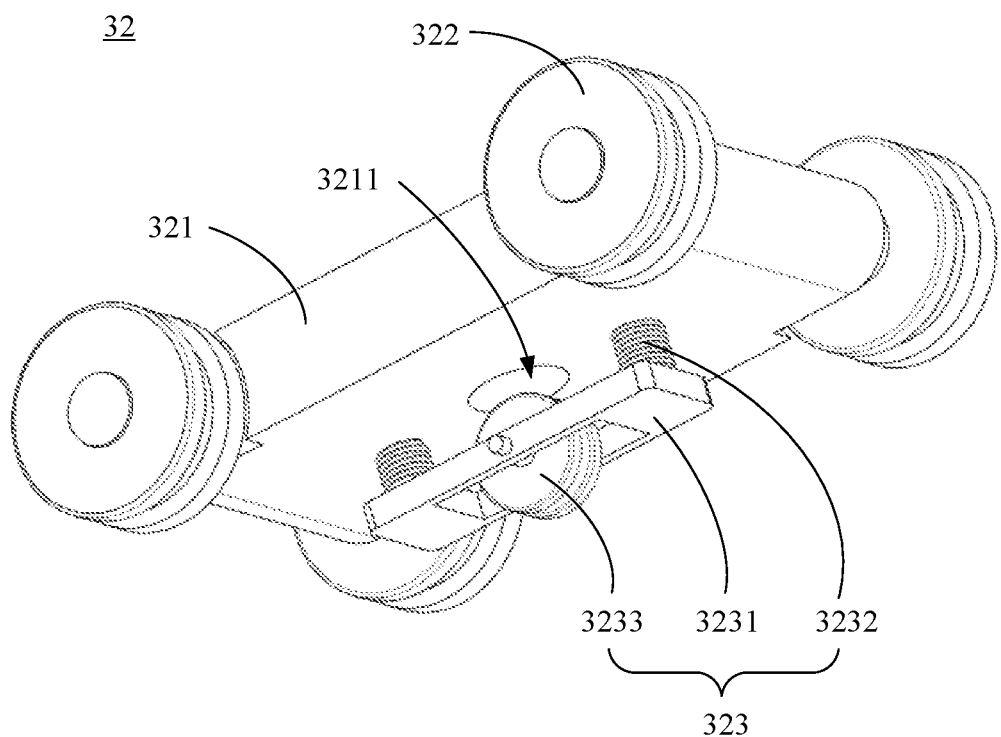
FIG. 4 is a schematic structural diagram of a movable assembly according to an embodiment of this application.

Refer to FIG. 4 and FIG. 2 together. FIG. 4 is a schematic structural diagram of a movable assembly according to an embodiment of this application. In some embodiments, the movable assembly 32 includes a connection portion 321, first sliding wheels 322, and a floating portion 323. The connection portion 321 is connected to the threading rod 31, and the first sliding wheels 322 are disposed on the connection portion 321. The floating portion 323 is disposed on a side of the connection portion 321 facing away from the threading rod 31, where a side of the floating portion 323 facing away from the connection portion 321 abuts against the first guide groove 12 or the second guide groove 22 so as to floatingly adjust a dimension of the threading assembly 30 in the first direction a.

Specifically, the connection portion 321 is fixedly connected to one end of the threading rod 31, and the first sliding wheels 322 can slide in the first guide groove 12 or the second guide groove 22 so as to drive the threading rod 31 to move in the second direction b. The floating portion 323 is disposed on the side of the connection portion 321 facing away from the threading rod 31 in the first direction a. Therefore, when the first sliding wheels 322 slide in the first guide groove 12 or the second guide groove 22, the floating portion 323 can abut against an inner side wall of the first guide groove 12 or the second guide groove 22, such that during the movement of the threading rod 31, a distance between the two floating portions 323 in the first direction a can be adjusted floatingly.

It should be noted that due to the long length of the oven, when the first guide rail 10 and the second guide rail 20 are disposed on the inner wall of the oven, there is often a specific mounting error, such that a distance between the first guide rail 10 and the second guide rail 20 in the width direction of the electrode plate 201 is not exactly consistent. Therefore, when the first sliding wheels 322 slide in the first guide groove 12 or the second guide groove 22, if the distance between the first guide rail 10 and the second guide rail 20 in the width direction of the electrode plate 201 becomes short, it is easy to cause the threading rod 31 to skew, which causes the electrode plate 201 to be jammed and affects the traveling of the electrode plate 201.

To resolve the preceding problem, the floating portion 323 is disposed on a side of the connection portion 321 facing away from the threading rod 31. When the distance between the first guide rail 10 and the second guide rail 20 in the width direction of the electrode plate 201 becomes short, the floating portion 323 can adjust a distance between the connection portion 321 and the first guide rail 10 or the second guide rail 20 in the width direction of the electrode plate 201, so as to avoid jamming of the threading rod 31.

Optionally, in some embodiments, a plurality of first sliding wheels 322 enclose a virtual graph, and the floating portion 323 is disposed at the geometric center of the virtual graph. In this way, when the floating portion 323 abuts against the inner side wall of the first guide rail 10 or the second guide rail 20 in the width direction of the electrode plate 201, a pressure transferred by the floating portion 323 is applied to the center of the connection portion 321, thereby making a force applied on the connection portion 321 more uniform, and avoiding the skewing of the threading rod 31 caused by a non-uniform force. Specifically, in this embodiment, the first sliding wheels 322 are provided in a quantity of four and are evenly arranged on the connection portion 321 along the periphery of the connection portion 321. Therefore, the four first sliding wheels 322 enclose a virtual rectangle, and the floating portion 323 is disposed at the geometric center of the virtual rectangle.

In some embodiments, the floating portion 323 includes a mounting bracket 3231 spaced apart from the connection portion 321 and an elastic member 3232 connected between the mounting bracket 3231 and the connection portion 321. The elastic member 3232 is configured to floatingly adjust the dimension of the threading assembly 30 in the first direction a.

Specifically, in this embodiment, the elastic member 3232 is constructed as a spring, and the spring can flexibly adjust the distance between the mounting bracket 3231 and the inner wall of the first guide rail 10 or the second guide rail 20 in the width direction of the electrode plate 201, thereby effectively avoiding the jamming of the threading rod 31 when the threading rod 31 drives the electrode plate 201 to travel.

In some embodiments, the floating portion 323 includes a second sliding wheel 3233, where the second sliding wheel 3233 is rotatably connected to the mounting bracket 3231 and spaced apart from the connection portion 321 in the first direction a. When the first sliding wheels 322 slide in the first guide groove 12 or the second guide groove 22, the second sliding wheel 3233 can abut against the inner side wall of the first guide rail 10 or the second guide rail 20 and slide on the inner side wall of the first guide rail 10 or the second guide rail 20. Therefore, the second sliding wheel 3233 can convert sliding friction between the mounting bracket 3231 and the inner side wall of the first guide rail 10 or the second guide rail 20 into rolling friction, thereby reducing a friction force and making the electrode plate 201 travel more smoothly.

Further, an escape groove 3211 is provided at a position of the connection portion 321 corresponding to the second sliding wheel 3233, so as to prevent the second sliding wheel 3233 from abutting against the connection portion 321 when the spring is compressed, meaning that the sliding of the second sliding wheel 3233 on the inner wall of the first guide rail 10 or the second guide rail 20 is ensured to be smoother.

In some embodiments, the second sliding wheel 3233 exceeds the first sliding wheel 322 in the first direction a. This can ensure that when the movable assembly 32 is located in the first guide groove 12 or the second guide groove 22, the second sliding wheel 3233 is first in contact with the inner side wall of the first guide rail 10 or the second guide rail 20 first, such that a distance between the connection portion 321 and the inner sidewall of the first guide rail 10 or the second guide rail 20 can be adjusted.

In some embodiments, the first guide rail 10 and the second guide rail 20 are non-metallic guide rails; and/or the first sliding wheels 322 and the second sliding wheel 3233 are non-metal sliding wheels.

It should be noted that, in the related art, the guide rails in the threading apparatus 100 and the movable assemblies in the guide rails are usually made of metal materials. However, there is a high-temperature environment inside the oven. When the movable assembly moves in the guide rail, metal particles are produced due to friction. Once the metal particles are attached to the electrode plate 201, the performance of the resulting battery produced by using such electrode plate 201 will be affected.

In view of this, in this embodiment, the first guide rail 10, the second guide rail 20, the first sliding wheels 322, and the second sliding wheel 3233 may all be made of non-metallic materials. Specifically, non-metallic materials such as Teflon can be used for making the first guide rail 10, the second guide rail 20, the first sliding wheels 322, and the second sliding wheel 3233, or the first guide rail 10, the second guide rail 20, the first sliding wheels 322, and the second sliding wheel 3233 that are made of metal materials are coated with a layer of non-metal material such as Teflon. This can effectively prevent the first sliding wheels 322 and the second sliding wheel 3233 from producing metal particles when moving in the first guide rail 10 or the second guide rail 20 and affecting the performance of the electrode plate 201.

It can be understood that, in some other embodiments, the first guide rail 10, the second guide rail 20, the first sliding wheels 322, and the second sliding wheel 3233 may alternatively be made of other non-metallic materials such as nylon, which is not described herein.

Still refer to FIG. 3. In some embodiments, the first guide rail 10 and the second guide rail 20 each include a top wall 13, a bottom wall 14, a first side wall 15, and two second side walls 16. The top wall 13 is disposed opposite the bottom wall 14, the first side wall 15 is connected between the top wall 13 and the bottom wall 14, and the two second side walls 16 are respectively formed by edges of the top wall 13 and the bottom wall 14 that are away from the first side wall 15 extending toward each other and bending toward the first side wall 15.

The top wall 13, the bottom wall 14, the first side wall 15, and the two second side walls 16 in the first guide rail 10 enclose the first guide groove 12, the top wall 13, the bottom wall 14, the first side wall 15, and the two second side walls 16 in the second guide rail 20 enclose the second guide groove 22, and the first side wall 15 is constructed as a side wall of the corresponding first guide groove 12 or the corresponding second guide groove 22. The first opening 11 and the second opening 21 are formed between the two second side walls 16 in the first guide rail 10 and between the two second side walls 16 in the second guide rail 20, respectively.

The first guide groove 12 and the second guide groove 22 each formed through enclosure of the top wall 13, the bottom wall 14, the first side wall 15, and the two second side walls 16 can better restrict the first sliding wheels 322 therein, thereby ensuring the stable movement of the movable assembly 32 within the first guide rail 10 or a second guide rail 20.

Still refer to FIG. 2, further, some of the first sliding wheels 322 are movably disposed between the top wall 13 and the second side wall 16 adjacent to the top wall 13, and the remaining first sliding wheels 322 are movably disposed between the bottom wall 14 and the second side wall 16 adjacent to the bottom wall 14. Specifically, the upper two first sliding wheels 322 of the four first sliding wheels 322 are restricted between the top wall 13 and the second side wall 16 adjacent to the top wall 13 in the width direction and the height direction of the electrode plate 201. The other two lower first sliding wheels 322 are also restricted between the bottom wall 14 and the second side wall 16 adjacent to the bottom wall 14 in the width direction and the height direction of the electrode plate 201.

In this way, the movable assembly 32 is more tightly connected to the first guide rail 10 and the second guide rail 20, preventing the movable assembly 32 from detaching from the first guide rail 10 or the second guide rail 20, thereby ensuring stable traveling of the electrode plate 201.

In addition, the threading apparatus 100 further includes a drive assembly (not shown in the figure), where the drive assembly is configured to drive the threading rod 31 to move within the first guide rail 10 or the second guide rail 20. Specifically, in this embodiment, a traction rope may be used as the drive assembly. One end of the traction rope is fixedly connected to the threading rod 31, and the other end is connected to a power source or directly manually pulled, thereby driving the threading rod 31 to move.

In some other embodiments, a motor may also be used as the drive assembly and is disposed on the connection portion 321 in driving connection with the first sliding wheel 322. In this way, the first sliding wheels 322 rotate under the drive of the motor, thereby driving the threading rod 31 to move. Certainly, other similar alternatives may also be used as the drive assembly, which is not described herein.

When this application is specifically used, the electrode plate 201 is first fastened to the threading rod 31, and the first sliding wheels 322 are rolled in the first guide groove 12 or the second guide groove 22 under the action of an external force, thereby driving the electrode plate 201 on the threading rod 31 to move in the oven and implementing drying of the electrode plate 201.

In addition, the second sliding wheel 3233 abuts against the first side wall 15 of the first guide rail 10 or the second guide rail 20 in the width direction of the electrode plate 201. In the moving process of the electrode plate 201, when the distance between the first guide rail 10 and the second guide rail 20 in the width direction of the electrode plate 201 changes from long to short, the spring is compressed under the pressure of the first guide rail 10 and the second guide rail 20, thus driving the second sliding wheel 3233 to follow the compression of the spring. Therefore, the distance between the connection portion 321 and the first side wall 15 of the first guide rail 10 or the second guide rail 20 in the width direction of the electrode plate 201 becomes gradually short, thereby avoiding jamming of the threading rod 31 caused by the collision between the connection portion 321 and the first side wall 15 of the first guide rail 10 or the second guide rail 20. This helps make the electrode plate 201 travel more smoothly in the oven.

The threading apparatus 100 in the foregoing embodiments has at least the following advantages:

(1) The two ends of the threading rod 31 are inserted into the first guide rail 10 and the second guide rail 20 in the width direction of the electrode plate 201, respectively, which can reduce the space occupied by the threading apparatus 100 in the height direction, thereby improving the utilization of the space inside the oven.

(2) The first sliding wheels 322 are restricted between the top wall 13 and the second side wall 16 adjacent to the top wall 13, or the first sliding wheels 322 are restricted between the bottom wall 14 and the second side wall 16 adjacent to the bottom wall 14, which can make the movable assembly 32 more stable in the first guide rail 10 and the second guide rail 20.

(3) The elastic member 3232 can flexibly adjust the distance between the connection portion 321 and the first side wall 15 of the first guide rail 10 or the second guide rail 20 in the width direction of the electrode plate 201, which avoids jamming of the threading rod 31 caused by the collision between the connection portion 321 and the first side wall 15 of the first guide rail 10 or the second guide rail 20 and makes the electrode plate 201 travel more smoothly.

(4) The second sliding wheel 3233 converts the sliding friction between the movable assembly 32 and the first side wall 15 of the first guide rail 10 or the second guide rail 20 into the rolling friction, reducing the friction therebetween, which is conducive to improving the moving efficiency.

(5) The first guide rail 10, the second guide rail 20, the first sliding wheel 322, and the second sliding wheel 3233 are all made of non-metallic materials, which can effectively avoid metal particles produced in the moving process, thereby preventing the metal particles from contaminating the electrode plate 201.

Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this disclosure, and descriptions thereof are specific and detailed, but should not be construed as a limitation on the scope of this disclosure. It should be noted that those of ordinary skill in the art may further make several modifications and improvements without departing from the concept of this disclosure, and these modifications and improvements also fall within the protection scope of this disclosure. Therefore, the protection scope of this disclosure should be subject to the appended claims.

What is claimed is:

1. An apparatus for transporting an electrode plate, comprising:
    an oven;
    a first guide rail and a second guide rail, spaced apart from each other inside the oven in a first direction, a first opening and a second opening being respectively provided on a surface of the first guide rail and a surface of the second guide rail that face each other; and
    an assembly having a first end and a second end opposite to each other in the first direction, the first end being disposed in the first guide rail through the first opening, and the second end being disposed in the second guide rail through the second opening;
    wherein the assembly comprises:
        a rod having a third end and a fourth end opposite to each other in the first direction;
        a first movable assembly disposed at the third end and disposed in the first guide rail; and
        a second movable assembly disposed at the fourth end and disposed in the second guide rail, one of the first movable assembly and the second movable assembly comprising a body connected to the rod, and a plurality of wheels disposed on the body, and the plurality of wheels being disposed in and sliding in one of the first guide rail and the second guide rail.

2. The apparatus according to claim 1, wherein:
    the first guide rail is provided with a first guide groove extending in a second direction, the second direction being a transporting direction of the electrode plate and intersecting the first direction;
    the second guide rail is provided with a second guide groove extending in the second direction; and
    the first movable assembly and the second movable assembly are accommodated in the first guide groove and the second guide groove, respectively.

3. The apparatus according to claim 2, wherein the one of the first movable assembly and the second movable assembly further comprises:
    a floating portion, disposed on a side of the body facing away from the rod, a side of the floating portion facing away from the body abutting against the first guide groove or the second guide groove to floatingly adjust a dimension of the assembly in the first direction.

4. The apparatus according to claim 3, wherein the floating portion comprises:
    a mounting bracket, spaced apart from the body; and
    an elastic member, connected between the mounting bracket and the body to floatingly adjust the dimension of the assembly in the first direction.

5. The apparatus according to claim 4, wherein the floating portion comprises a sliding wheel rotatably connected to the mounting bracket and spaced apart from the body in the first direction.

6. The apparatus according to claim 5, wherein the sliding wheel exceeds the plurality of wheels in the first direction.

7. The apparatus according to claim 5, wherein the first guide rail and the second guide rail are non-metallic guide rails.

8. The apparatus according to claim 5, wherein the plurality of wheels and the sliding wheel are non-metallic sliding wheels.

9. The apparatus according to claim 3, wherein:
the first guide rail and the second guide rail each comprise a top wall, a bottom wall, a first side wall, and two second side walls, the top wall being disposed opposite the bottom wall, the first side wall being connected between the top wall and the bottom wall, and the two second side walls are respectively formed by an edge of the top wall and an edge of the bottom wall that are away from the first side wall extending toward each other and bending toward the first side wall;
the top wall, the bottom wall, the first side wall, and the two second side walls of the first guide rail enclose to form the first guide groove, with the first side wall of the first guide rail being constructed as a side wall of the first guide groove;
the top wall, the bottom wall, the first side wall, and the two second side walls of the second guide rail enclose to form the second guide groove, with the first side wall of the second guide rail being constructed as a side wall of the second guide groove; and
the first opening and the second opening are formed between the two second side walls of the first guide rail and between the two second side walls of the second guide rail, respectively.

10. The apparatus according to claim 9, wherein:
one or more of the plurality of wheels are disposed between the top wall and the second side wall adjacent to the top wall of the one of the first guide rail and the second guide rail; and
another one or more of the plurality of wheels are disposed between the bottom wall and the second side wall adjacent to the bottom wall of the one of the first guide rail and the second guide rail.

* * * * *